United States Patent [19]

Biondi et al.

[11] Patent Number: 4,906,089
[45] Date of Patent: Mar. 6, 1990

[54] AUTOMOTIVE TILT MIRROR

[76] Inventors: Giovanni Biondi, 167 White Rd., Scarsdale, N.Y. 10583; George Spector, 233 Broadway Rm 3815, New York, N.Y. 10007

[21] Appl. No.: 225,709

[22] Filed: Jul. 28, 1988

[51] Int. Cl.⁴ ............................ G02B 7/18; B60R 1/06
[52] U.S. Cl. .................................... 350/637; 248/481; 350/605; 350/632
[58] Field of Search ............... 350/278, 605, 608, 637, 350/279, 632; 248/481

[56] References Cited

U.S. PATENT DOCUMENTS

| | | | |
|---|---|---|---|
| 4,128,310 | 12/1978 | Miller | 350/608 |
| 4,171,875 | 10/1979 | Taylor et al. | 350/637 |
| 4,201,451 | 5/1980 | Jacob | 350/278 |
| 4,449,788 | 5/1984 | Suzuki | 350/637 |
| 4,488,777 | 12/1984 | Bauer et al. | 350/278 |
| 4,640,590 | 2/1987 | Wunsch | 350/637 |
| 4,669,825 | 6/1987 | Itoh et al. | 350/278 |
| 4,746,206 | 5/1988 | Kusztos et al. | 350/637 |

Primary Examiner—Bruce Y. Arnold
Assistant Examiner—Martin Lerner

[57] ABSTRACT

An apparatus for operating a driver's side view mirror in a motor vehicle that has a directional indicator lever is provided and consists of a structure for adjustably holding a mirror within a housing in which the housing is secured on an outer surface of the driver's side of the motor vehicle. A mechanism is electrically activated by the directional indicator lever for moving the mirror from a normal position into the passing position so that a driver within the motor vehicle can see into the passing lane in order to safely steer the motor vehicle into the passing lane. The mechanism then moves the mirror back into the normal position.

2 Claims, 1 Drawing Sheet

AUTOMOTIVE TILT MIRROR

BACKGROUND OF THE INVENTION

The instant invention relates generally to remote controlled mirrors and more specifically it relates to an apparatus for operating a driver's side view mirror in a motor vehicle.

Numerous remote controlled mirrors have been provided in prior art that are each adapted to by moved by an electric motor connected to a manually operable switch. For example, U.S. Pat. Nos. 4,657,362; 4,696.555 and 4,701,037 all are illustrative of such prior art. While these units may be suitable for the particular purpose to which they address, they would not be as suitable for the purposes of the present invention as heretofore described.

SUMMARY OF THE INVENTION

A primary object of the present invention is to provide an apparatus for operating a driver's side view mirror in a motor vehicle that will overcome the shortcomings of the prior art devices.

Another object is to provide an apparatus for operating a driver's side view mirror in a motor vehicle in which movement of the directional indicator lever to indicate a left turn, will activate a mechanism to move a mirror so that a driver within the motor vehicle can see into the passing lane in order to safely steer the motor vehicle into the passing lane.

An additional object is to provide an apparatus for operating a driver's side view mirror in a motor vehicle in which the moving mechanism utilizes electro-magnets controlled by switches which are depressed by an actuator member in the directional indicator lever.

A further object is to provide an apparatus for operating a driver's side view mirror in a motor vehicle that is simple and easy to use.

A still further object is to provide an apparatus for operating a driver's side view mirror in a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
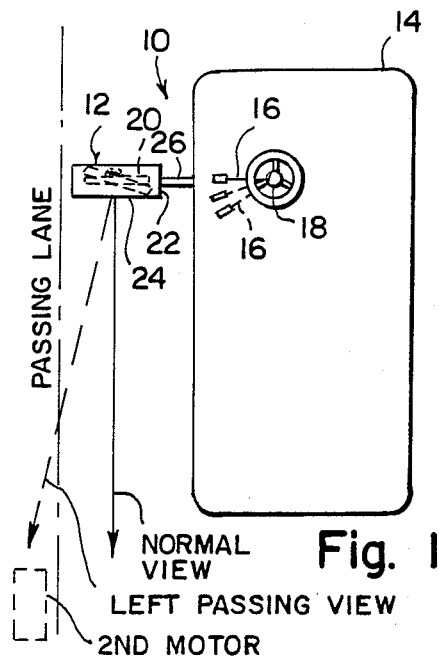
FIG. 1 is a diagrammatic top view of a motor vehicle with invention installed therein in which movement of the directional indicator lever to indicate a left turn will activate a mechanism to move a mirror so that a driver within the motor vehicle can see into the passing lane in order to safely steer the motor vehicle into the passing lane.
Figure 3:
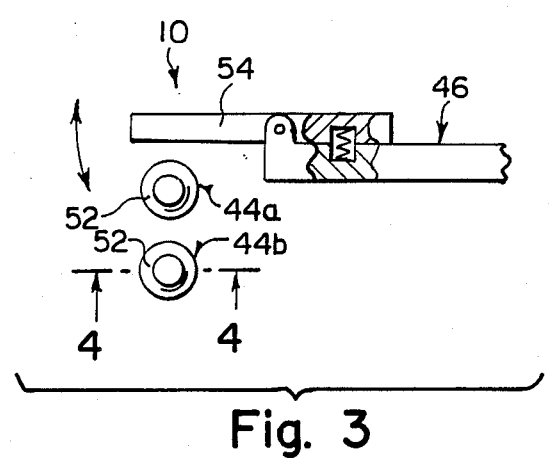
FIG. 3 is a top view with parts broken away showing the activator arm that's controlled by the directional indicator lever, ready to depress the switches of the circuit to move the mirror accordingly.
Figure 2:
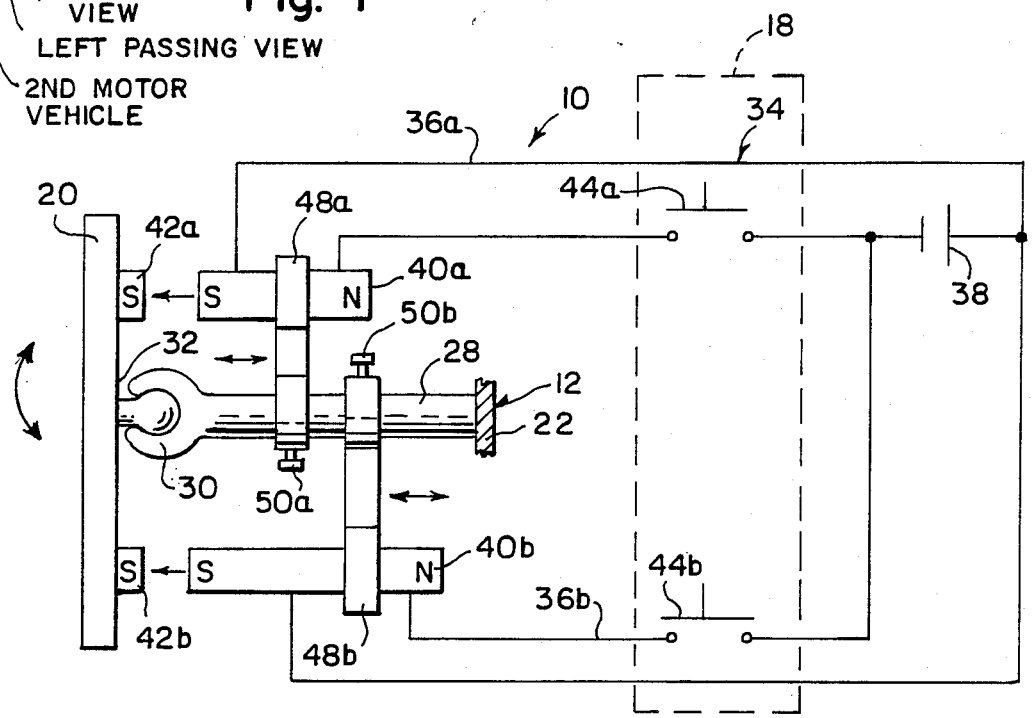
FIG. 2 is a top view of the mirror with housing broken away showing the electrical circuit for moving the mirror to the passing position and back to normal position.
Figure 4:
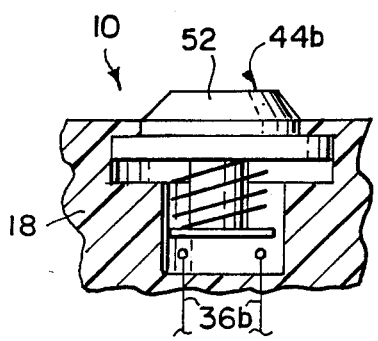
FIG. 4 is a cross sectional view taken along line 4—4 in FIG. 3 showing the structure of one of the switches in greater detail.

Turning now descriptively to the drawings, in which similar reference characters denote similar elements throughout the several views the figures illustrate an apparatus 10 for operating a driver's side view mirror 12 in a motor vehicle 14 that has a directional indicator lever 16 on a steering wheel column 18. The apparatus 10 contains a mirror 20 and a housing 22 having an opening 24 for receiving the mirror 20. A mounting bracket 26 secures the housing 22 on an outer surface of driver's side of the motor vehicle 14. A support arm 28 has its rear end affixed to the housing 22, while a ball and socket connector 30 is disposed between front end of the support arm 28 and central rear surface 32 of the mirror 20 for adjustably holding the mirror 20 within the housing 22.

A mechanism 34 is electrically activated by the directional indicator lever 16 for moving the mirror 20 from a normal position into a passing position so that a driver (not shown) within the motor vehicle 14 can see into passing lane in order to safely steer the motor vehicle 14 into the passing lane and then move the mirror 20 back into the normal position.

The mechanism 34 includes two electrical circuits 36a and 36b extending between the mirror 20 and the steering wheel column 18. A power source 38 being the motor vehicle battery, is electrically connected into both of the circuits 36a and 36b. A pair of electromagnets 40a and 40b are disposed onto the support arm 28, with each of the electro-magnets 40a and 40b connected into one of the respective circuits 36a and 36b. A pair of magnets 42a and 42b are disposed onto the rear surface 32 of the mirror on either side of the support arm 28 so that each of the magnets 42a and 42b will interact with one of the respective electro-magnets 40a and 40b. A pair of switches 44a and 44b are disposed into the steering wheel column 18, with each of the switches 44a and 44b electrically connected into one of the respective circuits 36a and 36b.

An actuator member 46 is disposed within the directional indicator lever 16, whereby a first downward movement of the directional indicator lever 16 for indicating a left turn will cause the actuator member 46 to operate the first switch 44a and activate the first electro-magnet 40a for repelling the first magnet 42a thus moving the mirror 20 to the passing position. A second downward movement of the directional indicator lever 16 for indicating a left turn will then cause the activator member to operate the second switch 44b and activate the second electro-magnet 40b for repelling the second magnet 42b thus moving the mirror 20 back to the normal position.

A pair of clamp members 48a and 48b are also provided. Each one is connected to one of the respective electromagnets 40a and 40b and is slideably disposed onto the support arm 28 so that the electro-magnets 40a and 40b can be adjustable with relationship to the respective magnets 42a and 42b for controlling movement of the mirror 20. A pair of set screws 50a and 50b are for locking the clamp members 48a and 48b onto the support arm 28.

Each of the switches 44a and 44b is a normally opened push button spring biased type having a circular beveled head 52 thereon. The actuator member 46 has a spring biased pivotable finger 54 at distal end thereof to operate the first and second switches 44a and 44b by depressing each respective head 52 during the first downward and second downward movement of the directional indicator lever 16. The finger 54 will pivot down and away from the second and first switches 44b and 44a during upward movement of the directional indicator lever 16 so as not to depress each respective head 50.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An apparatus for operating a driver's side view mirror in a motor vehicle having a directional indicator lever on a steering wheel column, which comprises:
   (a) a mirror;
   (b) a housing having an opening for receiving said mirror;
   (c) means for securing said housing on an outer surface of driver's side of the motor vehicle;
   (d) means for adjustably holding said mirror within said housing;
   (e) means electrically activated by the directional indicator lever, for moving said mirror from a normal position into a passing position so that a driver within the motor vehicle can see into passing lane in order to safely steer the motor vehicle into the passing lane and then moving said mirror back into the normal position, wherein said securing means is a mounting bracket, wherein said adjustable holding means comprises:
   (f) a support arm having a rear end affixed to said housing;
   (g) a ball and socket connector disposed between front end of said support arm and central rear surface of said mirror, wherein said moving means comprises:
   (h) two electrical circuits extending between said mirror and the steering wheel column;
   (i) a power source electrically connected into both of said circuits;
   (j) a pair of electro-magnets disposed onto said support arm with each of said electro-magnets electrically connected into one of said respective circuits;
   (k) a pair of magnets disposed onto the rear surface of said mirror on either side of said support arm so that each of said magnets will interact with one of said respective electro-magnets;
   (l) a pair of switches disposed into the steering wheel column, with each of said switches electrically connected into one of said respective circuits; and
   (m) an actuator member disposed within the directional indicator lever, whereby a first downward movement of the directional indicator lever for indicating a left turn will cause said actuator member to operate first of said switches and activate first of said electro-magnets for repelling first of said magnets thus moving said mirror to the passing position and a second downward movement of the directional indicator lever for indicating a left turn will then cause said actuator member to operate second of said switches and activate second of said electro-magnet for repelling second of said magnets thus moving said mirror back to the normal position;
   (n) a pair of clamp members, each of which is connected to one of said respective electro-magnets and slideably disposed onto said support arm so that said electro-magnets can be adjustable with relationship to said respective magnets for controlling movement of said mirror; and
   (o) a pair of set screws for locking said clamp members onto said support arm.

2. An apparatus as recited in claim 1, further comprising:
   (a) each of said switches being a normally opened push button spring biased type having a circular beveled head thereon; and
   (b) said actuator member having a spring biased pivotable finger at distal end thereof to operate said first and second switches by depressing each respective head during the first downward and the second downward movement of the directional indicator lever, whereby said finger will pivot down and away from said second and first switches during upward movement of the directional indicator lever so as not to depress each respective head.

* * * * *